(12) United States Patent
Chen et al.

(10) Patent No.: US 7,617,174 B2
(45) Date of Patent: Nov. 10, 2009

(54) METHOD AND SYSTEM FOR AUTOMATIC SERVICE COMPOSITION

(75) Inventors: Yi-Chia Chen, Taipei (TW); Wei-Tek Hsu, Tu Cheng (TW); Peng-Hsiang Hung, Kaohsiung (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 899 days.

(21) Appl. No.: 10/811,900

(22) Filed: Mar. 30, 2004

(65) Prior Publication Data
US 2005/0097224 A1 May 5, 2005

(30) Foreign Application Priority Data
Nov. 5, 2003 (TW) ............................... 92130952 A (51) Int. Cl.
*G06F 15/00* (2006.01)
*G06F 15/18* (2006.01)
(52) U.S. Cl. ............................. 706/62; 705/7; 709/201; 709/203
(58) Field of Classification Search ................. 706/62; 705/4, 7; 709/223, 250
See application file for complete search history.

(56) References Cited

U.S. PATENT DOCUMENTS

| 2003/0085079 A1* | 5/2003 | Koehler et al. | 187/380 |
| 2004/0162741 A1* | 8/2004 | Flaxer et al. | 705/7 |
| 2004/0168988 A1* | 9/2004 | Ikeda | 210/744 |

* cited by examiner

*Primary Examiner*—David R Vincent
*Assistant Examiner*—Kalpana Bharadwaj
(74) *Attorney, Agent, or Firm*—Bacon & Thomas, PLLC (57) ABSTRACT

A method and system for automatic service composition is disclosed, wherein a service registry stores a plurality of service specifications received from at least one service provider in a service repository, and receives service requests from service requestors. A composition engine of the service registry can automatically generate a series of actions from service specifications stored in the service repository according to the service request, and then passes those actions to the service requestor for being processed. In order to facilitate the preceding procedure of automatic composition, the composition engine pre-processes service requests and service specifications, and declares suitable new objects. The composition engine also post-processes the planning resolution generated by the planning module for translating the format of the planning resolution into a processing language, and finally passes the resolution to a processing engine of the service requestor for being processed.

19 Claims, 12 Drawing Sheets

PDDL problem file program code

```
(define (problem iTour1)
      (:domain iTour)
      (:objects locObj1 locObj2 - Location
                      itineraryObj - Itinerary)

(:init (Start    locObj1)
         (End       locObj2))
      (:goal (and (Trip itineraryObj locObj1 locObj2))))
```

FIG. 10

PDDL domain file program code

```
(define (domain iTour)
    (:requirements :strips :equality :typing)
    (:predicates
            (Start    ?loc - Location)
            (End      ?loc - Location)
            (At            ?station - Station
                           ?loc - Location)
            (Trip   ?i - Itinerary
                           ?loc1 ?loc2 - Location)
    )

(:action AskStation
            :parameters    (?loc - Location
                                   ?station - Station)
            :effect  (and    (At ?station ?loc))
    )

(:action MakeItinerary
            :parameters    (?loc1 ?loc2 - Location
                                   ?station1 ?station2 - Station
                                   ?i - Itinerary)
            :precondition (and    (Start ?loc1)
                                           (End ?loc2)
                                           (At ?station1 ?loc1)
                                           (At ?station2 ?loc2))

:effect  (and    (Trip  ?i ?loc1 ?loc2))
    )
)
```

FIG. 11

PDDL domain file program code

```
(define (domain iTour)
        (:requirements :strips :equality :typing)
        (:predicates
                (Start    ?loc - Location)
                (End      ?loc - Location)
                (At              ?station - Station
                                 ?loc - Location)
                (Trip    ?i - Itinerary
                                 ?loc1 ?loc2 - Location)
                (used    ?o - Object)
        )

(:constants newStationObj1 newStationObj2 newStationObj3 - Station
                        newItineraryObj - Itinerary)
        (:action AskStation
                :parameters     (?loc - Location
                                        ?station - Station)
                :precondition (and (not (used ?station)) )
                :effect  (and    (At ?station ?loc)
                                                        (used ?station)
                                        )
        )

(:action MakeItinerary
                :parameters     (?loc1 ?loc2 - Location
                                        ?station1 ?station2 - Station
                                        ?i - Itinerary)
                :precondition (and     (Start ?loc1)
                                                (End ?loc2)
                                                (At ?station1 ?loc1)
                                                (At ?station2 ?loc2)
                                                (not (used ?i))
                                        )

:effect  (
                                        and    (Trip  ?i ?loc1 ?loc2)
                                                (used ?i)
                                )
        )
)
```

FIG. 12

METHOD AND SYSTEM FOR AUTOMATIC SERVICE COMPOSITION

BACKGROUND OF THE INVENTION

1. Field of the Invention

The present invention relates to automatic service composition technology and, more particularly, to a method and system for automatic service composition using AI (artificial intelligence) planning technology, which is used in a network environment.

2. Description of the Related Art

With developments in Internet technology, web services are becoming more and more popular. Many different standard protocols for web services have been developed, such as simple object access protocol (SOAP) for communications, web services description language (WSDL) for descriptions, and universal description discovery and integration (UDDI) tools for searching and integration. All of these protocols are based on the extensible markup language (XML).

In the predictable future, e-commerce activities on the Internet will be increasingly complicated. One transaction may involve several different services provided by different companies. For example, a user wants to use a web service to organize a trip, which may involve a flight ticket booking service from an airline company, a train ticket booking service from the railroad company, a reservation service from a hotel, etc. The user must use a local computer to connect to a remote website that provides these types of web services. However, the remote website still processes the order by human, which may result in mistakes, such as faulty ordering of the tickets, or incorrect reservation data. Therefore, many businesses use software to improve business process management to achieve an automated network environment.

The common automated network environment includes automatic service composition functionality and automatic service execution functionality. For automatic service composition, when the user inputs a request, the system automatically searches for the proper services and composes a service flow that satisfies the request. For automatic service execution, the system automatically executes the steps defined in the service flow.

Figure 1:
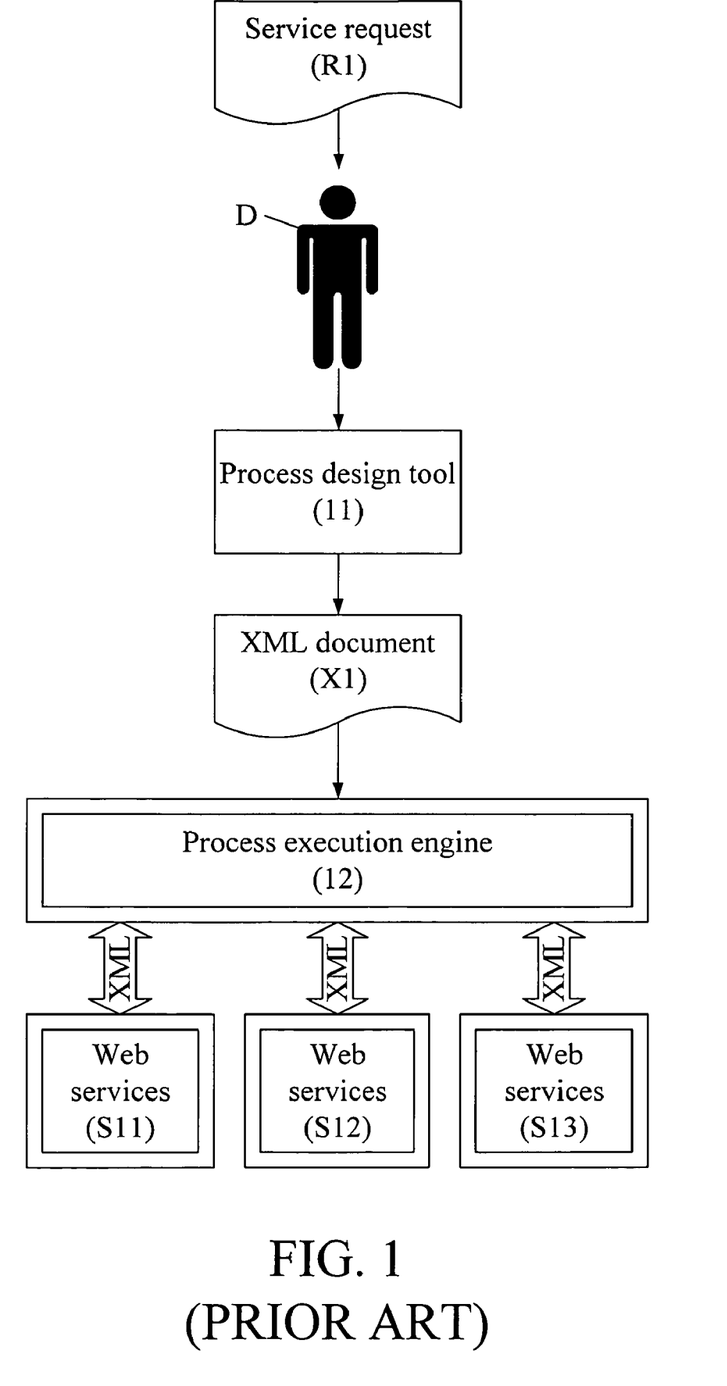
FIG. 1 is a functional block diagram of a prior art of web service composition provided by industrial circles.

FIG. 1 is a functional block diagram of a prior art web service execution as executed in an e-commerce environment. When a programmer P receives a service request R1, he or she uses a process design tool 11, such as a graphical user interface (GUI) tool, to create a process flowchart according to the service request R1 and to translate the process flowchart into an XML document X1, and a process execution engine 12 executes a plurality of related actions according to the XML document X1 and calls different web services S11, S12, and S13. However, the method mentioned above only uses the GUI tool or a simple data type searching mechanism to help the programmer to manually perform service request processing composition. Therefore, the programmer still needs to understand and search the different specifications for the different web services to compose the process satisfying different service requests. Furthermore, the processes are defined according to different requests, so the processes are incapable of adapting to different service request, and thus lack of flexibility and robustness.

Figure 2:
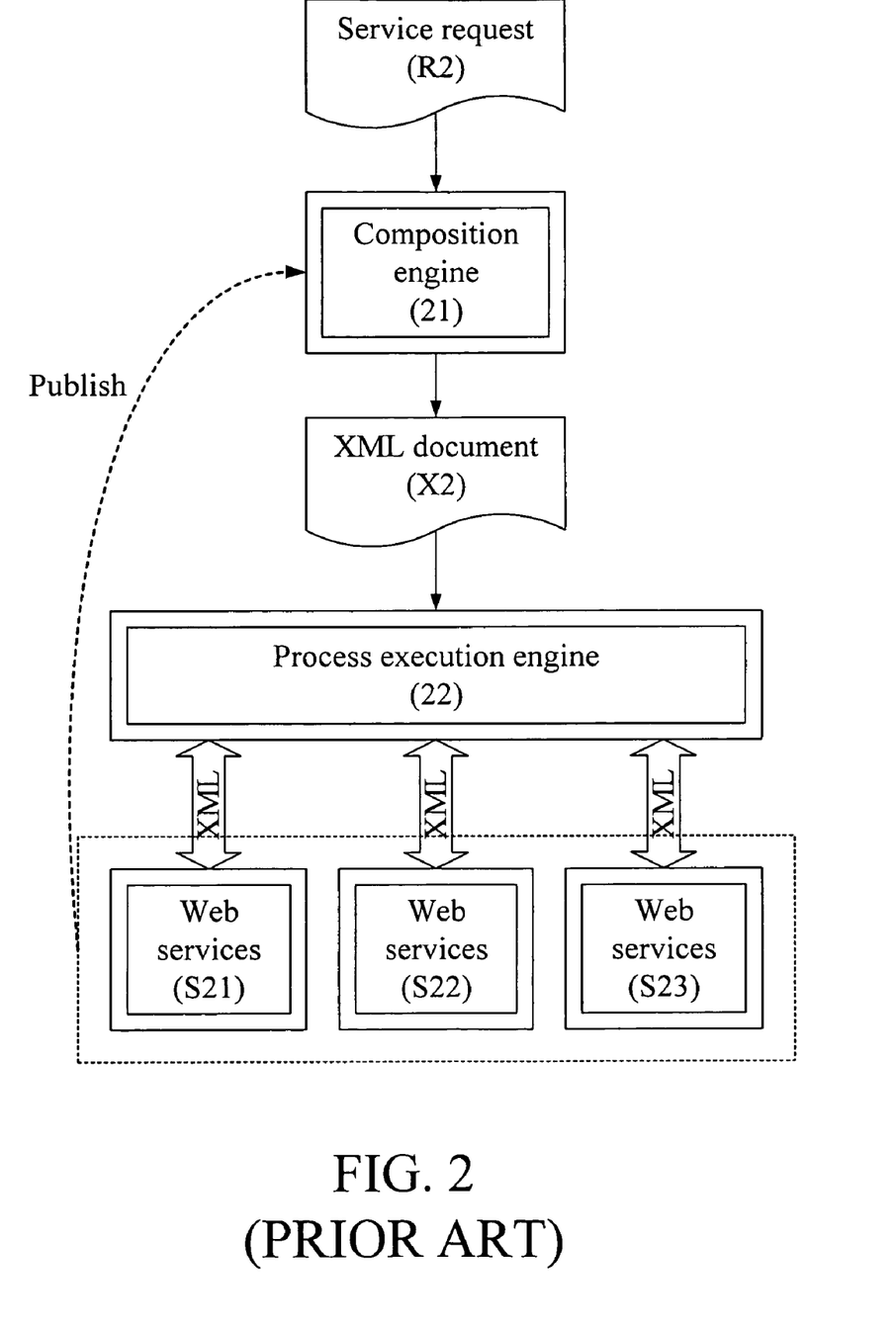
FIG. 2 is a functional block diagram of prior art of web service composition provided by a research academy.

FIG. 2 is a functional block diagram of a prior art of web service composition provided by the research academy. A composition engine 21 automatically generates an XML document X2 for a process according to a service request R2, then sends the process to a process execution engine 22 for execution and invoke web services S21, S22, and S23. The composition engine 21 utilizes AI (artificial intelligence) planning technology, and employs the DAML-S language for semantic web services to enhance the description abilities of the different service specifications, such as preconditions and effects used for defining the service.

However, the AI planning technology has a "new object problem": all related objects in the process need to be declared in advance; the executed actions are used for changing the object's status, not for generating new objects (i.e., objects that were not declared in advance). In a network environment, new objects are generated all the time. For example, when the user inputs a request that travels from point A to point B, a station object C for A and a station object D for B may be generated, which are not declared in advance. So the AI planning technology cannot produce a correct flow of services. Therefore, the prior art of web service composition can not apply to a real web service environment.

Therefore, it is desirable to provide a method and system for automatic service composition to mitigate and/or obviate the aforementioned problems.

SUMMARY OF THE INVENTION

A main objective of the present invention is to provide a method and system for automatic service composition, which uses a service composition engine to automatically and dynamically search proper services, composes a service flow, and then uses a execution engine to execute the service flow according to a request.

Another objective of the present invention is to provide a method and system for automatic service composition that uses AI planning technology with object requirement prediction and declaration technology to declare new objects. Logical constraints are utilized to services that generate new objects to assure the declared objects can be used correctly. Therefore, flexibility and robustness of the automatic service composition is improved and the integration time and costs are reduced.

The method for automatic service composition of the present invention can automatically search services from at least one registered service specification to find a single service or compose a service flow according to a service request. The method of the present invention first receives a problem file established according to the service request and a domain file established according to at least one service specification. Objects can be declared in both the problem file and the domain file. The service request applies logic statements to define an initial state and a goal state, thus obtains a series of action execution sequence used for transforming the initial state to the goal state to accomplish the service request. Each service specification is used for executing an action which defines an action name, and at least one input parameter or at least one output parameter, wherein each parameter defines a parameter name and a data type. Therefore, these parameters can be utilized in logical statements to define and at least one precondition or at least one effect. When the AI planning technology searches for executable process, it repeatedly determines if an action need to and when to be added into the process. At the same time, each parameter of the action needs to be bounded to an object with identical data type. If a set of objects can be connected to each parameter of the action and the status of the set of objects matches with the precondition of the action, the planning engine updates objects' status in this set according to effect of the action. Without declaring an object that is required by an action in the resulting plan, may cause a failure in generating a complete service execution plan. That's why the "new object problem" in AI planning technology is incurred.

In order to solve the prior art "new object problem", the method of the present invention predicts and declares new possible objects that may be generated and used in the entire process of web services by analyzing the service request and service specifications. Firstly, it establishes at least one level of data-type-service graph between all service specifications and data types. Next, it extracts data types needed by the declared objects of the service request to select at least one service specification related to the data type and storing the selected service specifications in a set of chosen services. Then, it counts the frequency N for each data type used as the input parameter and the frequency M for each data type used as the output parameter in the set of chosen services. If M>0, the data type is also used as the output parameter, and C×(N+M) new objects are declared in the domain file for the data type, wherein C is an integer. Finally, a series of action execution sequences of the single service or composite service are generated according to the problem file and the domain file to accomplish the service request. The method of the present invention further selects at least one service specification related to the data type according to the aforementioned data-type-service graph.

According to another characteristic of the present invention, a system for automatic service composition includes a service repository, a composition engine and a execution engine. The composition engine further includes a service request translation module, a service specification translation module, a planning module and a service composition translation module. The system for automatic service composition is used for executing the steps mentioned above to automatically search services from registered service specifications to find a single service or compose a service flow according to a service request.

Other objectives, advantages, and novel features of the invention will become more apparent from the following detailed description when taken in conjunction with the accompanying drawings.

DETAILED DESCRIPTION OF THE PREFERRED EMBODIMENT

Figure 3:
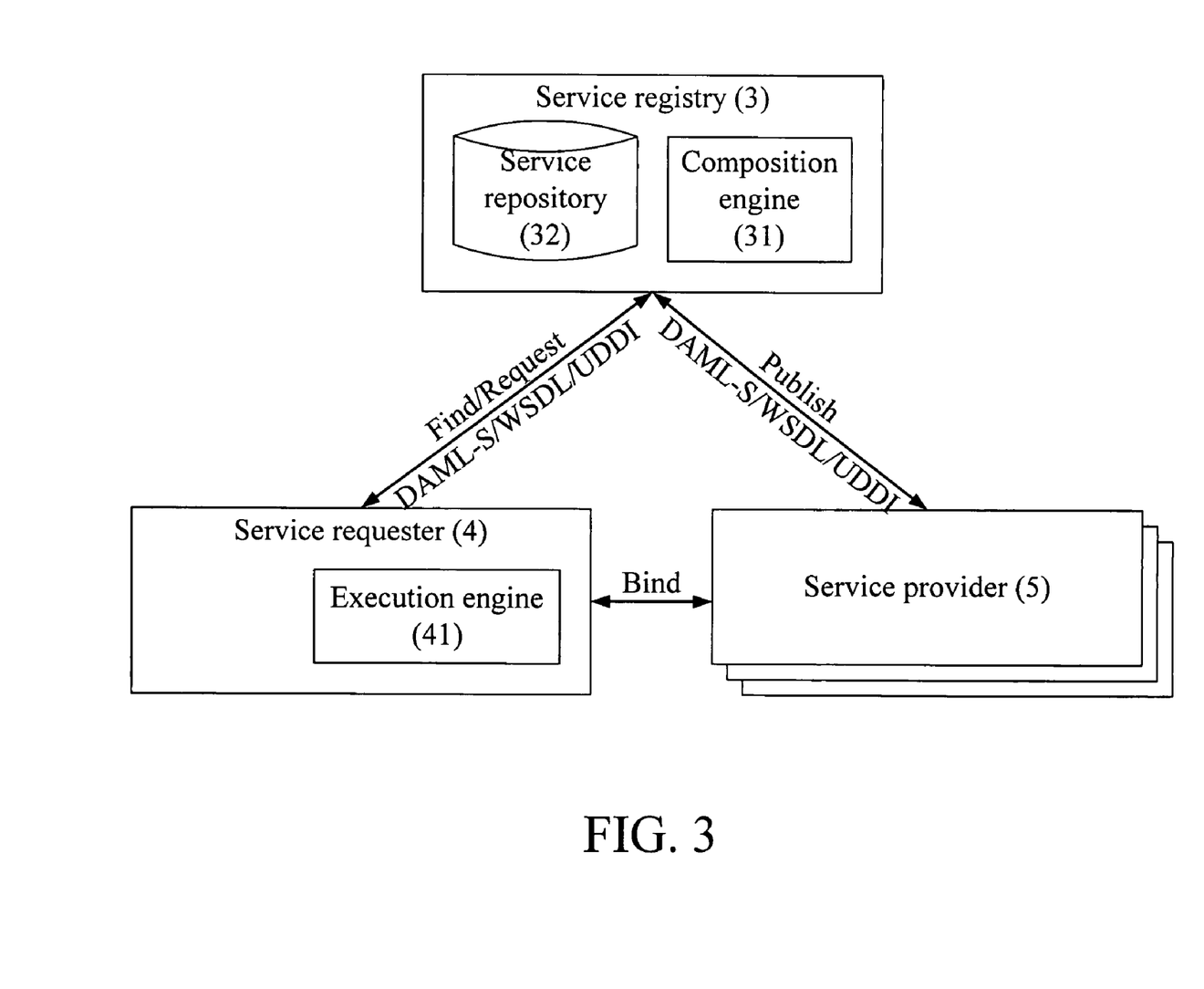
FIG. 3 is a schematic drawing of a practical environment according to a preferred embodiment of the present invention.

FIG. 3 is a schematic drawing of a practical environment according to a preferred embodiment of the present invention. The practical environment employs the web service technology and the semantic web technology to provide a distributed computing environment. As shown in FIG. 3, in this embodiment, an extended web service structure has a service registry 3, a service requester 4 and a service provider 5.

The service provider 5 defines each service specification that will be provided in the network environment, such as an Internet flight ticket booking service from an airline company, an Internet train ticket booking service from a railroad company, an Internet reservation service from a hotel, and Internet weather forecasting from weather bureau, etc., and employs the universal description discovery and integration (UDDI) communication protocol to publish the defined service specifications to the service registry 3 for completing registration. When the service registry 3 receives service specifications from different service providers 5, the service registry 3 stores the related information of these service specifications into a service repository 32. Additionally, the service registry 3 also receives a service request from the service requester 4 and uses a composition engine 31 to automatically and dynamically search for a proper service, or to compose a service flow to send back to the service requester 4, and then uses a execution engine 41 to execute the service flow. In particular, the composition engine 31 and the execution engine 41 can be combined as a single module according to system requirements, and the service requester 4 can be a program developer or a standard user.

In this embodiment, the service specifications defined by the service provider 5 are used for executing an action, which may include: a service address, an action name, input parameters, output parameters, preconditions and effects. Furthermore, the service request provided by the service requester 4 includes an initial state and a goal state, from which a series of actions transform the initial state to the goal state. The service request is translated into a problem file, and a plurality of service specifications are translated into a domain file. Objects required for describing the service request and service specifications are declared in the problem file and the domain file, which defines an object name and a data type.

The initial state and the goal state of the service request, and the preconditions and the effects of the service specification, are all described by a plurality of logic statements. One logic statement has one or more atomic formulas, and zero or more logic operators. The logic operators are AND, OR and NOT operators, and the atomic formula has a predicate and one or more object (or parameter) names, which are used for representing the object (or parameter) itself, or attributes defined by a predicate of another object (or parameter). For example, in Start [locObj1], Start is a predicate, locObj1 is an object, Start[locObj1] represents a location locObj1 having a Start attribute, which can be described as location locObj1 being a start location. As another example, consider the following atomic formula:

Trip [itineraryObj locObj1 locObj2].

The three objects: itineraryObj, locObj1, and locObj2 having a Trip attribute, which can be described as the data stored in itineraryObj being a schedule arranged from locOb1 to locObj2. In a further example:

Start[locObj1] and End[locObj2]

is a logical formula including a logic operator and two atomic formulas. The logical formula can be explained in different ways for different computer languages; however the meanings are similar. For example, in planning domain definition language (PDDL), the above atomic formula is presented as:

(and (Start locObj1)(End locObj2)).

Some logical formulas may skip the logic operators and use AND or OR as predetermined logic operators connected to all the atomic formulas in one logical formula; for example, the initial condition of the problem file in PDDL uses AND as a predetermined logic operator.

Figure 4:
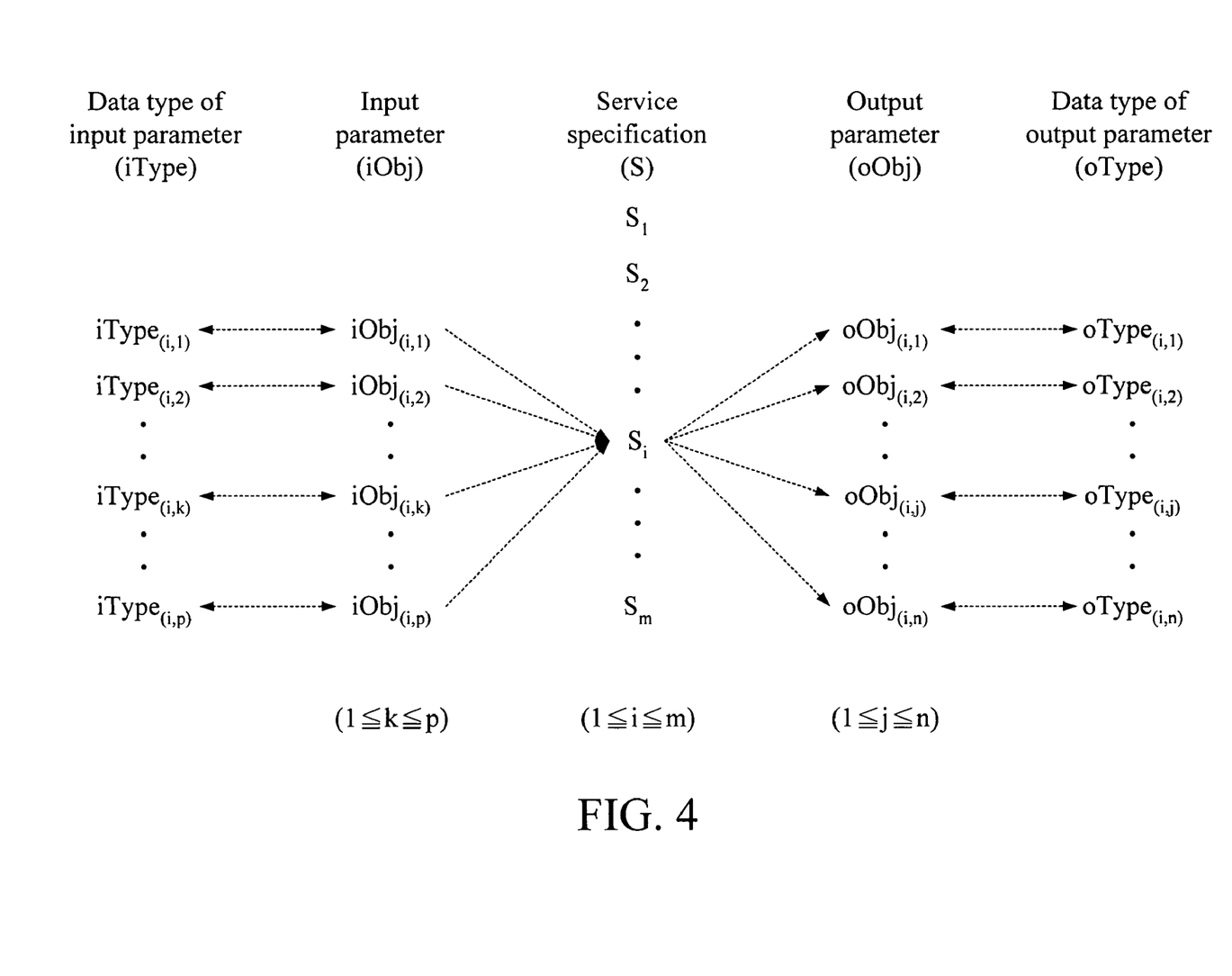
FIG. 4 is a schematic drawing of a service specification according to the preferred embodiment of the present invention.

FIG. 4 is a schematic drawing of a service specification according to the preferred embodiment of the present invention. In this embodiment, the service repository 32 stores m different service specifications S provided by different service providers 5. Take the i-th service specification $S_i(1 \leq i \leq m)$ as an example, which needs p input parameters, and n output parameters, and each input parameter and output parameter is correspondingly defined with a data type, such as the k-th input parameter $iObj_{(i,k)}$ ($1 \leq k \leq p$) of the service specifications $S_i$ that corresponds to a data type $iType_{(i,k)}$, and the j-th output parameter $oObj_{(i,j)}$ ($1 \leq j \leq n$) of the service specifications $S_i$ that corresponds to a data type $oType_{(i,j)}$. The input parameter, output parameter, data type, preconditions and effects are defined in the following description. Moreover, in this embodiment, DMAL-S and web services description language (WSDL) language standards are used for defining each service specification, wherein DAML-S is used for providing more abstract service specifications, such as the definitions of the preconditions and the effects; WSDL is used for providing more specific service specifications, such as the definitions of the service address, the action name, the input parameters and the output parameters. DAML-S and WSDL use resource description framework (RDF) and extensible markup language (XML), so each label has definite definitions for further translation. Furthermore, the language describing the service specifications is not limited to DAML-S and WSDL; any languages or standards that can provide related functions could be employed in this invention.

Figure 5:
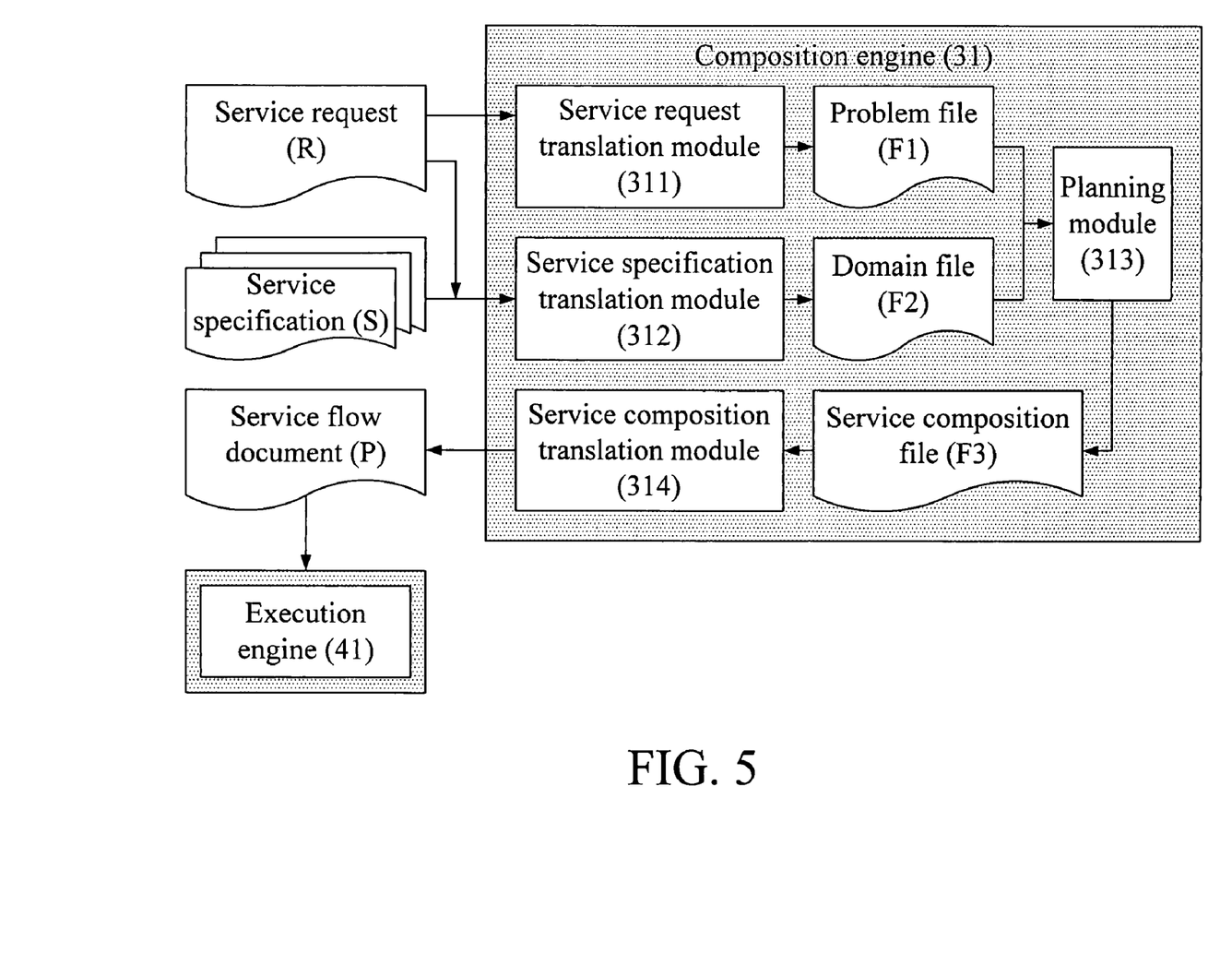
FIG. 5 is a functional block diagram according to the preferred embodiment of the present invention.
Figure 6:
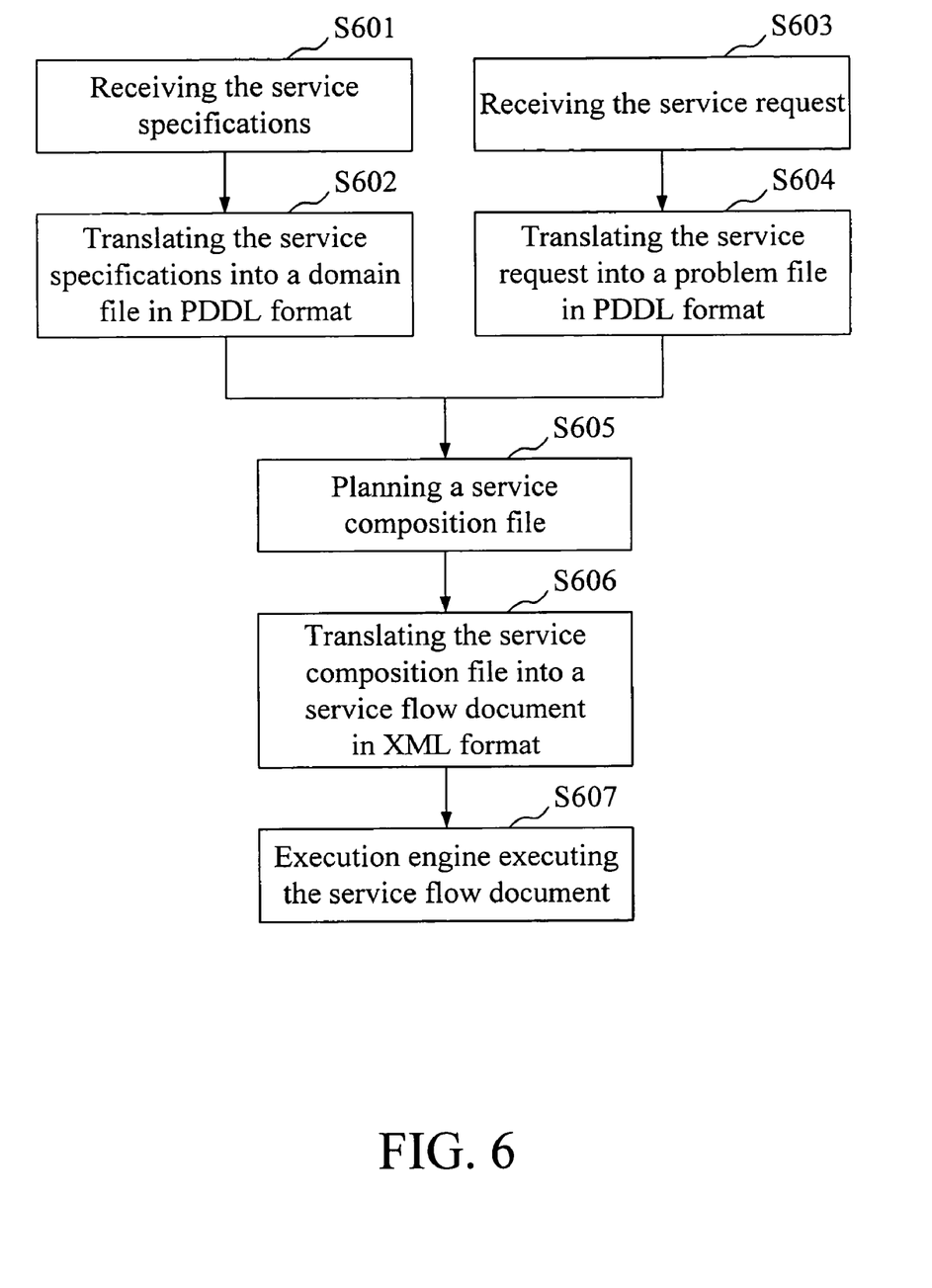
FIG. 6 is a flowchart according to the preferred embodiment of the present invention.

FIG. 5 is a functional block diagram according to the preferred embodiment of the present invention. FIG. 6 is a flowchart according to the preferred embodiment of the present invention. The composition engine 31 receives different service specifications S stored in the service repository 32 (step 601), and then a service specification translation module 312 translates the service specifications S in XML format into a domain file F2 that is in the planning domain definition language (PDDL) format (step 602) to describe specifications for each action. When the service registry 3 receives the service request R from the service requester 4, (step 603), a service request translation module 311 translates the service request R in XML format into a problem file F1 that is in the planning domain definition language (PDDL) format (step 604). Next, the problem file F1 and the domain file F2 are sent to a planning module 313 for computing a service composition file F3 that satisfies the service request R, formed by a series of service specifications S (step 605), and a service composition translation module 314 translates the service composition file F3 into a service flow document P in the XML format (step 606). Finally, the service flow document P is sent to the execution engine 41 of the service requester 4 for execution (step 607). It is noted that the service request and the service specification are not limited to being translated into the PDDL format; any language that can provide the same information can serve as the translation language.

Since RDF(S) and XML syntax have a definition for each label, which corresponds to the basic language unit of PDDL, the processes of the service request translation module 311, the service specification translation module 312 and the service composition translation module 314 that translate the XML file into the PDDL file or the PDDL file into the XML file are all well known, therefore there will be no more detailed description of them.

Figure 7:
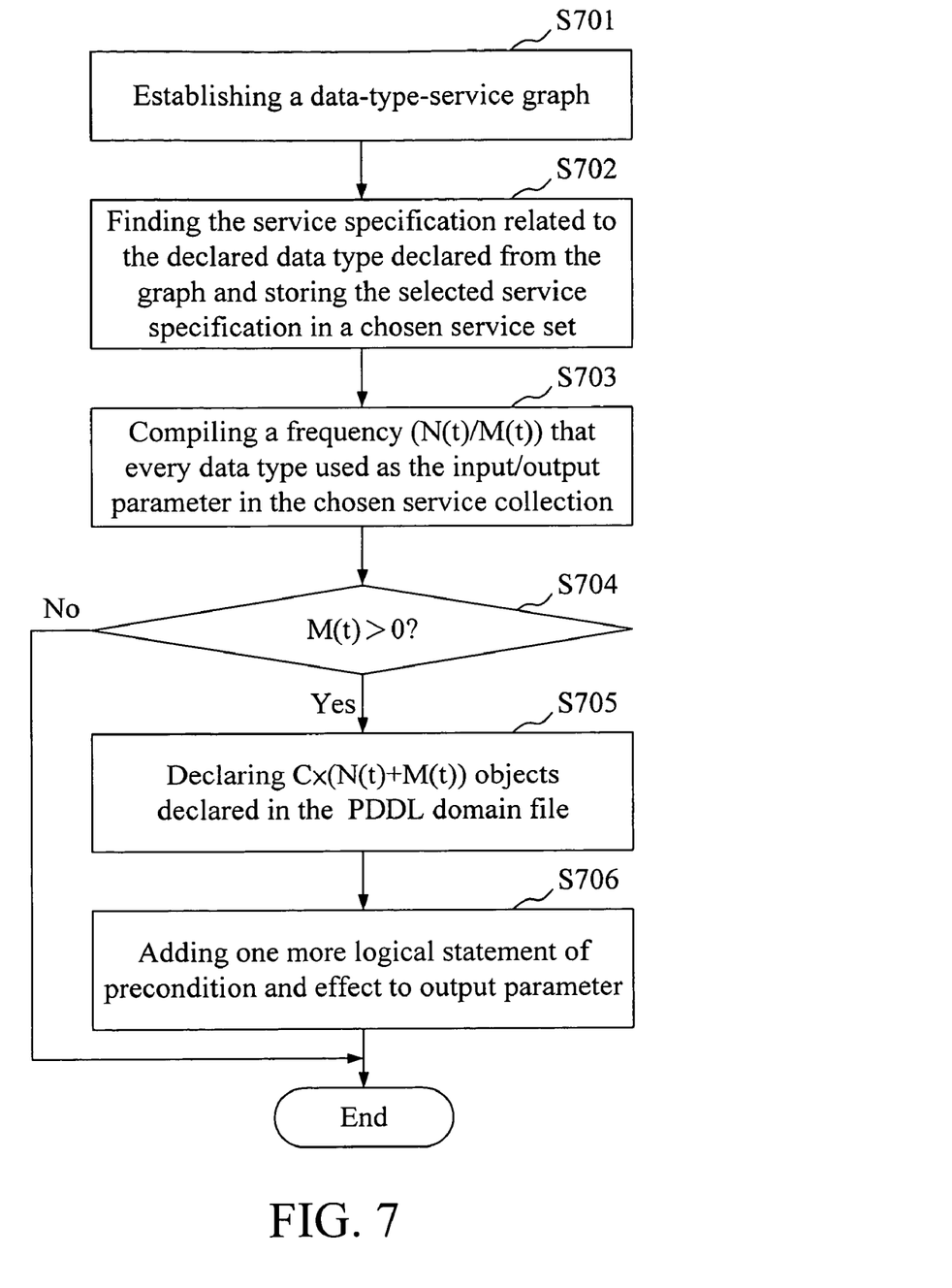
FIG. 7 is a flowchart of translating a service specification to a domain file established according to the preferred embodiment of the present invention.

FIG. 7 is a detailed flowchart of translating the service specification to a domain file shown in step 602 of FIG. 6. The following description explains how to solve the "new object" problem that occurs during planning a service composition with the service request R and the service specifications S. In this embodiment, the service request R from the service requester 4 is "looking for proper travel arrangements between two locations", for example, from New York to San Francisco. The service request R declares the following objects at the initial state and goal state, and uses predicates to define attributes of the objects:

(1) initial state: Location locObj1;
   Location locObj2;
   Itinerary itineraryObj;
   Start [locObj1];
   End [locObj2].

(2) goal state: Trip [itineraryObj locObj1 locObj2].

wherein, the above objects include two data types "Location" and "Itinerary". Two declared objects with the "Location" data type in the initial state use a predicate "Start" to define "Start[locObj1]". This atomic formula indicates that an object "locObj1" is a start location, and uses a predicate "End" to define "End[locObj2]", which indicates that an object "locObj2" is a destination. According to the service request R of the embodiment, the object "locObj1" is New York and the object "locObj2"is San Francisco. The goal state uses a predicate "Trip" to define an atomic formula:

Trip [itineraryObj locObj1 locObj2], which means that the data stored in the object "itineraryObj" is a travel plan from "locObj1" to "locObj2".

Figure 8:
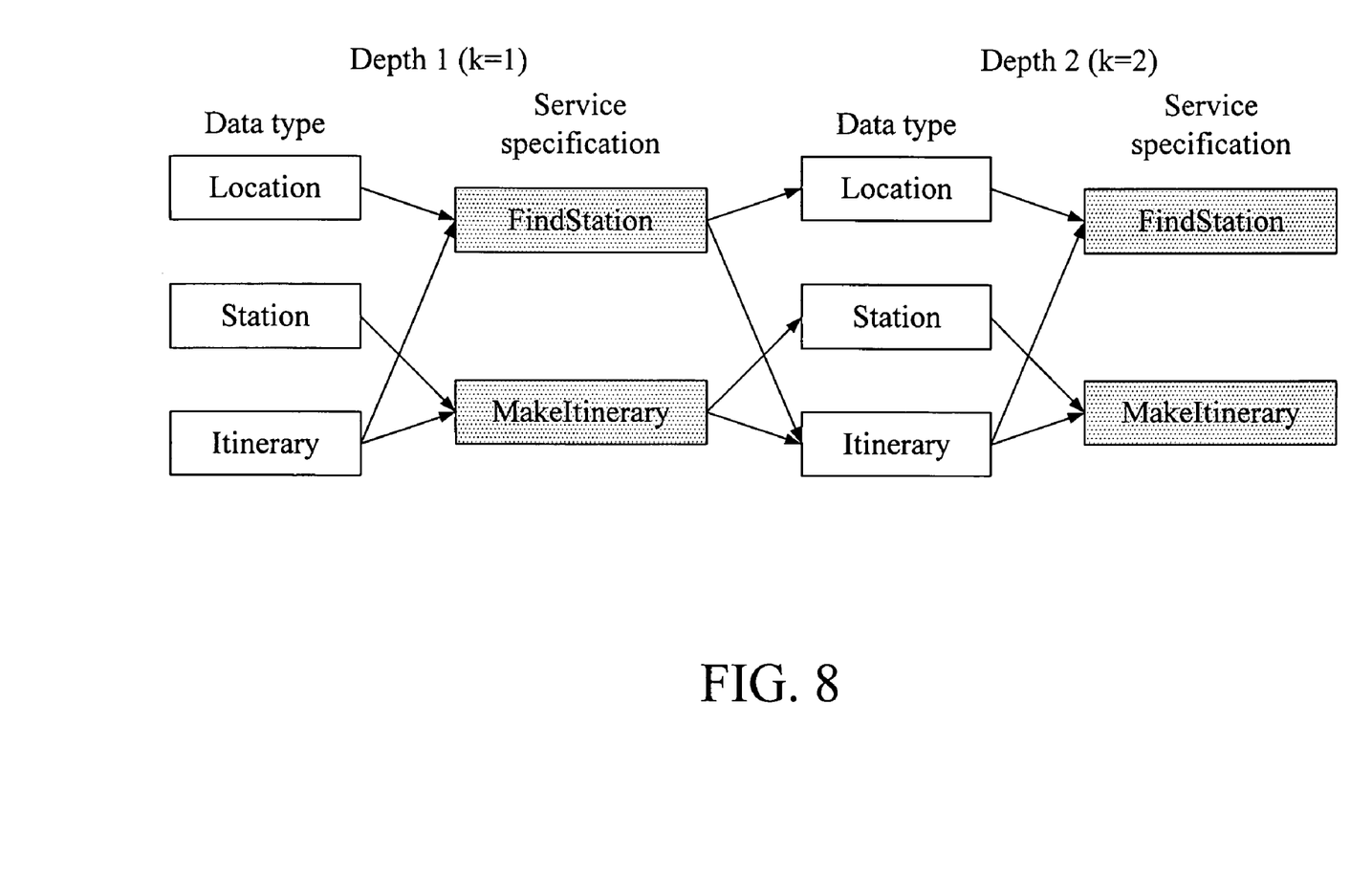
FIG. 8 is a schematic drawing showing a data-type-service graph according to the preferred embodiment of the present invention.

The service requester 4 does not know if there will be any new objects generated during the execution of the service request R, and the service requester 4 can only know what new objects were used after the entire service process is generated. However, if the new objects were not declared in advance, the service process cannot be completed. According to the connection between the service request R and the service specifications S shown in FIG. 7, the present invention predicts and declares the possible new objects. In order to save computing power and system resources on the composition engine 31, only the new objects related to the service request R are declared. First, the composition engine 31 needs to predict the services that are needed by the service request R for predicting the data types and number of new objects generated by the services. According to FIG. 7, the definition of the domain file F2 is analyzed to establish a data-type-service graph with k levels (step 701), which can be performed off-line (or on-line) to reduce network loading. As shown in FIG. 8, a data-type-service graph with two depths is established in this embodiment, and the number of depths can be adjusted according to system performance. Furthermore, in order to simplify the structure, the service specifications S of the embodiment only include "FindStation" and "MakeItinerary" (so m is 2), and the service specifications are defined as:

FindStation (Location ?loc, Station ?station):
precondition: no definition;
effect: At [?station,?loc];
MakeItinerary (Location ?loc1, Location ?loc2, Station ?station1,
Station ?station2, Itinerary ?i)
precondition: Start[?loc1] and End [?loc2] and At [?station1, ?loc1]
and At [?station2, ?loc2]
effect: Trip [?i, ?loc1, ?loc2]

wherein the name with the beginning of "?" is the output or input parameter defined by the service specifications. The service specification "FindStation" is used for finding a nearby airport (or station) "Station ?station" (the output parameter) after inputting location "Location ?loc" (the input parameter); the service specification "MakeItinerary" is used for inputting two locations ("Location ?loc1" and "Location ?loc2"), and two stations ("Station ?station1" and "Station ?station2"), if the following precondition is matched:

Start[?loc1] (?loc1 is the start location),
and At [?stataion1, ?loc1] (and ?station1 is a station for ?loc1),
and End[?loc2] (and ?loc2 is the destination location),
and At[?station2, ?loc2] (and ?station2 is a station for ?loc2).

Therefore, according to the effect of Trip [?i, ?loc1, ?loc2], the service provides a travel arrangement "?i" from the location "?loc1" to location "?loc2". Certainly, various service specifications S can be provided in the present invention.

In FIG. 8, all data types involved in all service specifications stored in the service repository 32 are firstly extracted, which include "Location", "Station" and "Itinerary", and then searching for the service specifications related to each data type is performed; for example, in depth 1, the data type "Itinerary" is only used by the service specification "MakeItinerary", so a connection is established between them. Similarly, the data type "Location" and "Station" have connections to their related service specifications. In depth 2, each service specification is connected to the related objects; for example, the service specification "MakeItinerary" relates to the three data types "Itinerary", "Location" and "Station".

According to the data type declared in the service request R, the service specification related to the declared data type from the graph is found, and the selected service specification is stored in a chosen service set (step 702). For example, the data type "Itinerary" is declared in the service request R; in depth 1 of the graph, "Itinerary" is connected to the service specification "MakeItinerary", but in depth 2 of the graph, the service specification "MakeItinerary" is connected to three data types "Itinerary", "Location" and "Station", and the data type "Station" is related to the service specification "FindStation". Therefore, when k=1, the data type "Itinerary" is only related to the service specification "MakeItinerary", but when k=2, the data type "Itinerary" is related to the service specifications "MakeItinerary" and "FindStation". When the factor k becomes larger, an increasing number of services related to the service requests are found, and a higher chance of success for service composition is obtained, but this will also require more computing and system resources from the composition engine 31. Therefore, k can be adjusted according to the system performances of the composition engine 31.

A statistical analysis is performed on the chosen service set, which includes a frequency for each data type being used as the input parameter is N(t), and a frequency for each data type being used as the output parameter is M(t) (step 703). In this embodiment, the output parameter indicates that a new object may be generated; when the frequency M(t) of one data type used as the output parameter is bigger than 0 (step 704), there are C×(N(t)+M(t)) objects declared in the PDDL domain file F2 (step 705), wherein C is an integer, which presents a maximum frequency of one action could be called in a plan which accepted by the composition engine 31. A system manager can adjust C according to the computing power and system resources. Afterwards, the frequency of each data type being used as an input parameter or output parameter in the chosen service set is:

Location: N(t)=3, M(t)=0;
Station: N(t)=2, M(t)=1;
Itinerary: N(t)=0, M(t)=1.

The data types mentioned above, taking "Station" as an example, which has been used as the output parameter, if C=1, there will be 3 (C×(N(t)+M(t))=1×(2+1)=3) new objects declared as data type "Station", which are "Station newObj1", "Station newObj2" and "Station newObj3".

Figure 9:
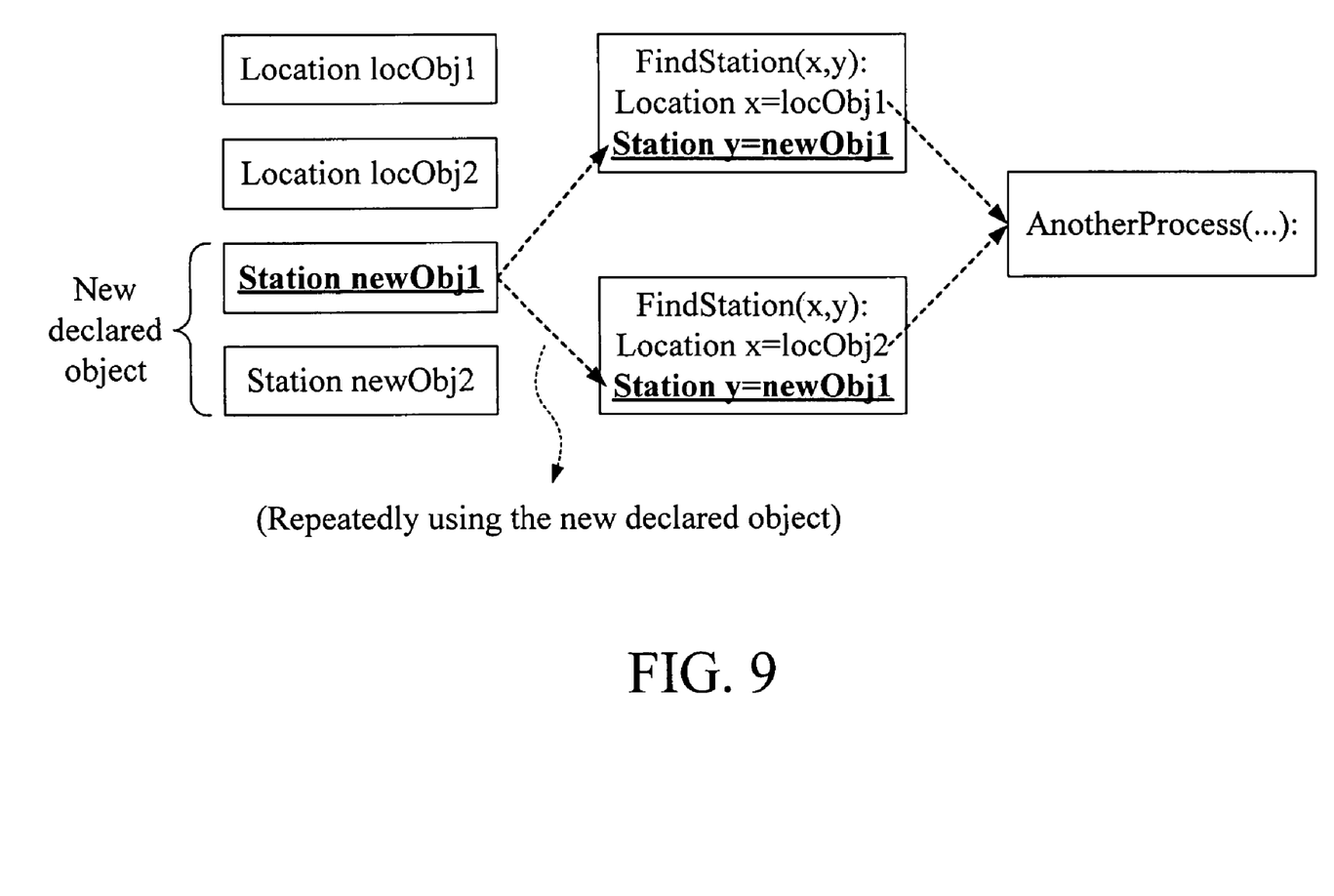
FIG. 9 is a schematic drawing showing a new declared object being used repeatedly according to the preferred embodiment of the present invention.

In addition, as shown in FIG. 9, when FindStation is executed twice, although different locations locOb1 and locOb2 are input, if there are no limitations, all found stations will be stored in newObj1, an executable process may still be generated, however, the parameters which are repeatedly assigned might cause incorrect execution results. Therefore, in order to prevent newly declared object being repeatedly used by mistake, to each output parameter oObj$_{(i,j)}$ must be added one more logical statements of precondition(not (used oObj$_{(i,j)}$)) and effect(used oObj$_{(i,j)}$) (step 706). The added precondition limits so that only unused new objects are valid; and the added effect declares which new object has been used to prevent use by other actions generating the same data type. Since each service specification S defines preconditions and effects, all parameters of each action must be connected to an existing object to execute a further plan. Afterwards, the planning module 313 plans the service composition file F3 formed by a series of service specifications S (step 605 shown in FIG. 6) according to the problem file F1 composed of the service request R and the domain file F2 composed of the service specifications S and the service request R, which comprises:

FindStation(Location ?loc, Station ?station):
Location ?loc=locObj1,
Station ?station=newObj1;
FindStation(Location ?loc, Station ?station):
Location ?loc=locObj2,
Station ?station=newObj2;
MakeItinerary (Location ?loc1, Location ?loc2, Station ?station1,
Station ?station2, Itinerary ?i)
Location ?loc1=locObj1,
Location ?loc2=locObj2,
Station ?station1=newObj1,
Station ?station2=newObj2,
Itinerary ?i=itineraryObj.

Therefore, the execution engine 41 needs to execute "FindStation" twice to find a station (airport) "newObj1" near New York and a station (airport) "newObj2" near San Francisco, then execute "MakeItinerary" to arrange the trip between New York and San Francisco.

Figure 10:
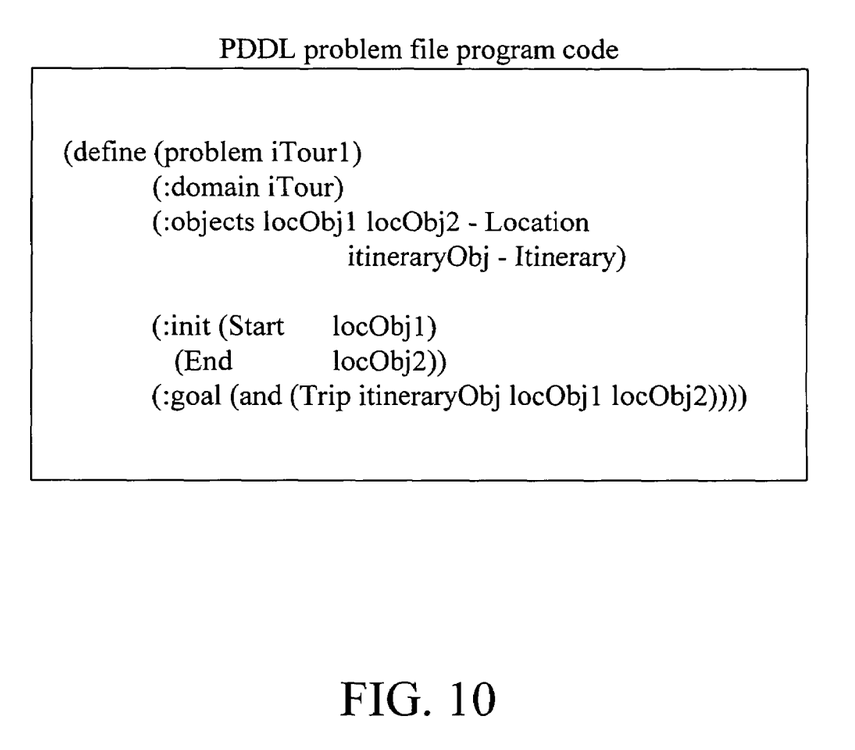
FIG. 10 shows program code of a service request in a PDDL problem file.
Figure 11:
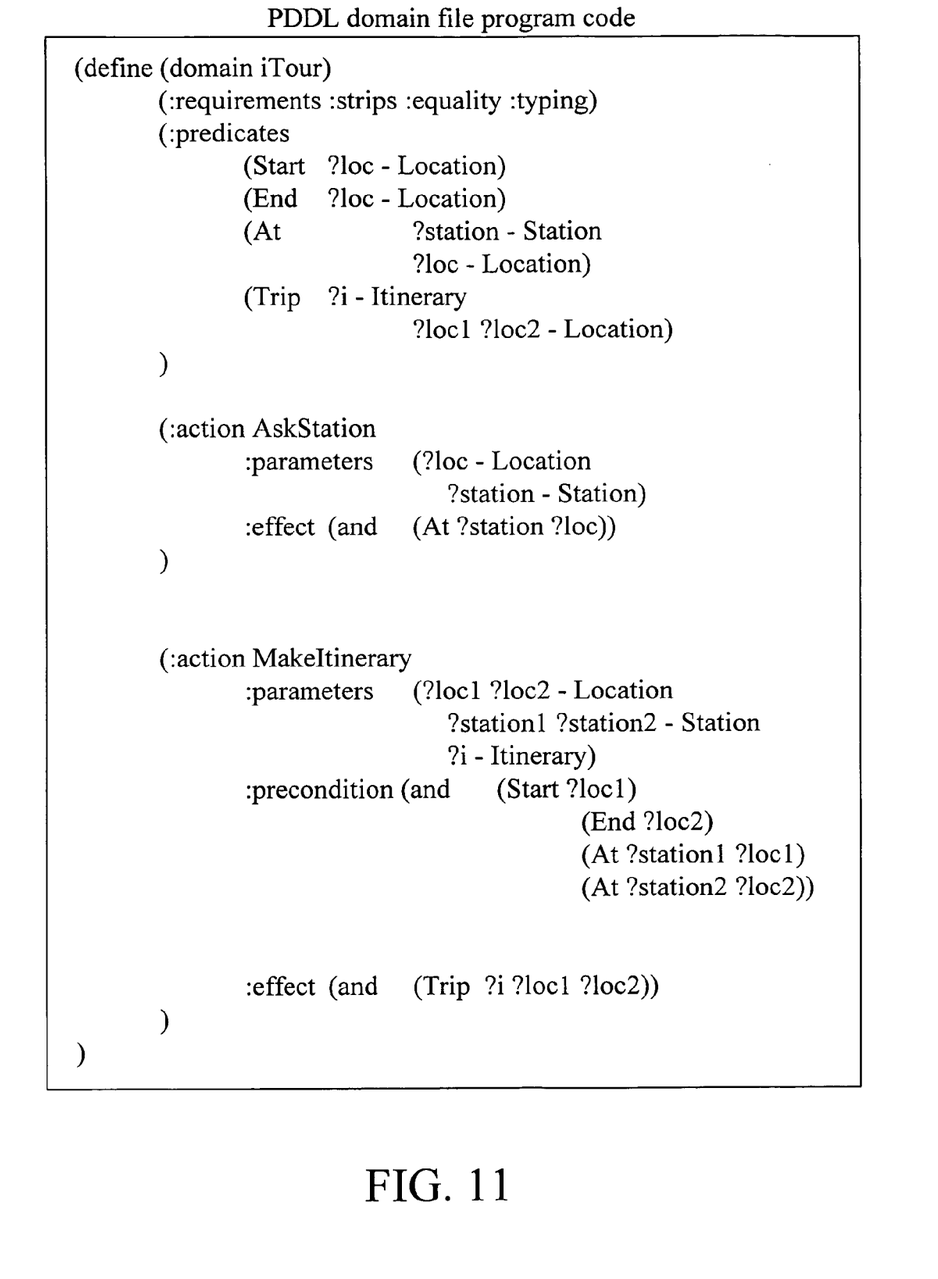
FIG. 11 shows program code of a service specification in the PDDL domain file without using the flowchart shown in FIG. 7.
Figure 12:
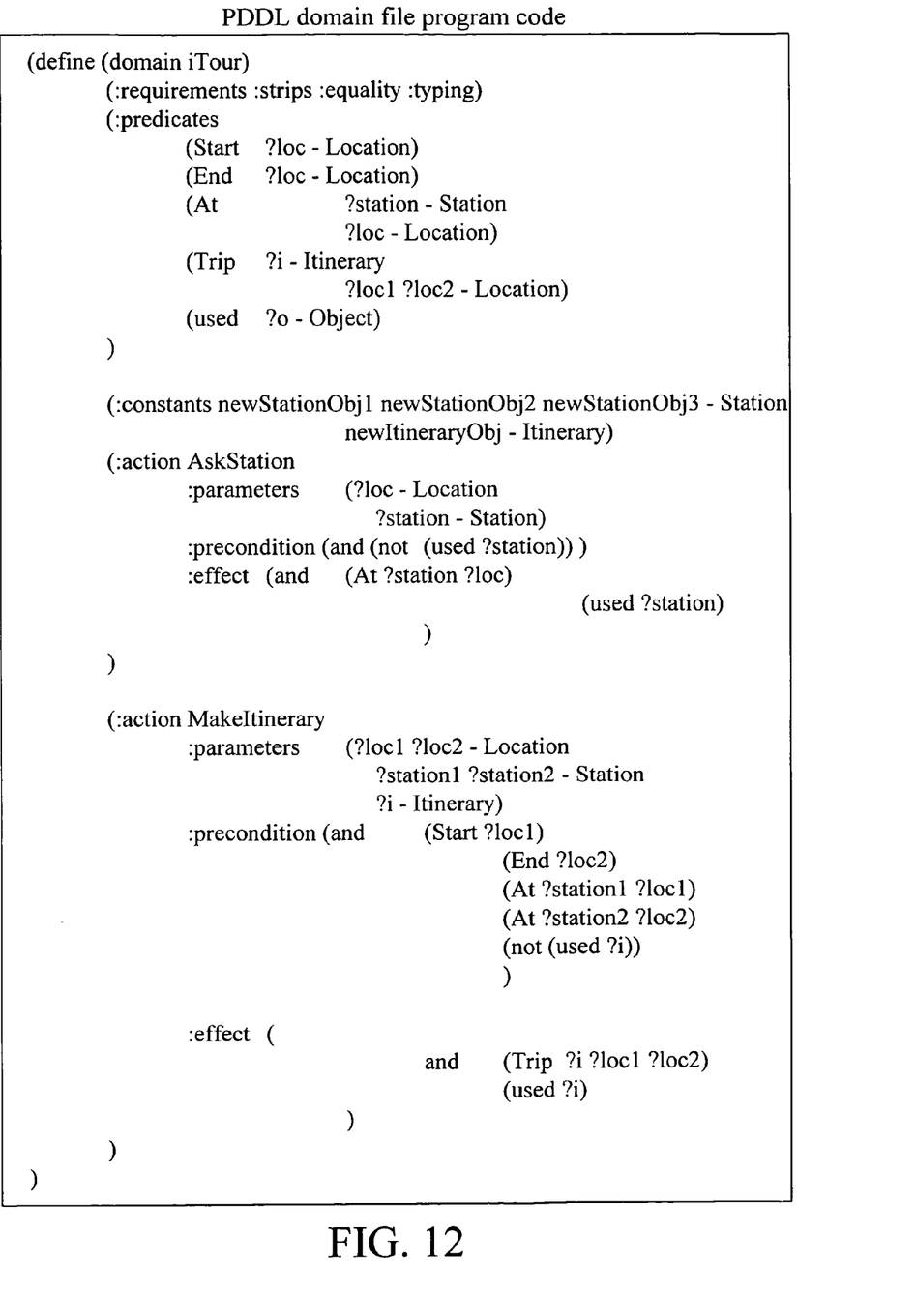
FIG. 12 shows program code of the service request and the service specification, which are analyzed by the flowchart shown in FIG. 7 in a PDDL domain file.

FIG. 10 shows program code of a service request in a PDDL problem file. FIG. 11 shows program code of a service specification in the PDDL domain file without using the flowchart shown in FIG. 7. When the AI planning engine takes the PDDL problem file shown in FIG. 10 and FIG. 11 as input, the entire service process cannot be successfully generated because the "new object" was not declared. FIG. 12 shows program code of the service request and the service specification, which are analyzed by the flowchart shown in FIG. 7, in the PDDL domain file. Since the possible new objects are declared in the program code, the entire service flow will be completed and automatic service composition is achieved.

According to the description mentioned above, the method for automatic service composition of the present invention uses AI planning techniques to develop a service composition engine that could automatically and dynamically search for appropriate web services, and compose a service execution flow to be executed on a execution engine. With techniques on predicting and declaring required new objects in the present invention the "new object problem" in the prior art is solved and ensure a faultless web service to each service request.

Although the present invention has been explained in relation to its preferred embodiment, it is to be understood that many other possible modifications and variations can be made without departing from the spirit and scope of the invention as hereinafter claimed.

What is claimed is:

1. A method for automatic service composition, searching services from registered service specifications to find a single service or compose a service flow according to a service request, the method comprising:

a service request receiving step, for receiving a problem file established according to the service request;

a service specification receiving step, for receiving a domain file established according to at least one service specification, the at least one service specification being used for executing an action which defines an action name, and at least one input parameter or at least one output parameter, wherein any two different service specifications can use an object with the same data type as the input parameter or the output parameter;

a new object predicting step, for predicting a new object by extracting data types needed by the declared objects of the problem file or the domain file to select at least one service specification related to the data type and storing the selected service specifications in a chosen service set;

a new object declaring step, for declaring the new object by counting a frequency N for each data type used as the input parameter and a frequency M for each data type used as the output parameter in the chosen service set; if M>0, the data type is also used as the output parameter, and C×(N+M) new objects are declared in the domain file for the data type, wherein C is an integer;

a service composition generating step, for generating a service flow by generating a series of action execution sequences of the single service or composite service, from service specifications stored in the service repository according to the problem file and the domain file, for being executed to accomplish the service request; and a correlation establishing step, for establishing at least one level of data-type-service graph between all service specifications and data types, wherein the new object predicting step follows the interactive usage correlation structure to select at least one service specification related to the data type;

wherein the service request is a file with an XML (extensible markup language) format and is translated into a problem file with a PDDL (planning domain definition language) format via a translation process.

2. The method claimed in claim 1, wherein the service request defines an initial state and a goal state and uses the series of action execution sequences to transform from the initial state to the goal state to accomplish the service request.

3. The method claimed in claim 1, wherein the service specifications are files with an XML format and are translated into a domain file with a PDDL format via a translation process.

4. The method claimed in claim 3, wherein a DMAL-S standard is used to define the service specifications, which includes definitions of a plurality of preconditions and effects, as a file based on a RDF (resource description framework) format.

5. The method claimed in claim 3, wherein a WSDL (web services description language) standard is used to define the service specifications, which includes definitions of a service address, an action name, a plurality of input parameters and a plurality of output parameters, as a file with an XML format.

6. The method claimed in claim 1, wherein the service specifications are defined by at least one service provider and are published in a service repository of a service registry.

7. The method claimed in claim 6, wherein a UDDI (universal description discovery and integration) registration protocol is used to publish the service specifications to the service registry.

8. The method claimed in claim 1, wherein the service specification defines at least one precondition or at least one effect.

9. The method claimed in claim 8, further comprising, after the new object declaring step, a modifying step, for adding a precondition and an effect to each output parameter of each service specification in the chosen service set.

10. A system for automatic service composition, searching services from registered service specifications to find a single service or compose a service flow according to a service request, the system comprising:

a service repository managed by a service registry, storing at least one service specification, each service specification being used for executing an action which defines an action name, and at least one input parameter or at least one output parameter, wherein any two different service specifications can use an object with the same data type as the input parameter or the output parameter;

a composition engine comprising:

a service request translation module for translating the service request to a problem file;

a service specification translation module for translating the service specification to a domain file and extracting data types needed by the declared objects of the problem file or the domain file to select at least one service specification related to the data type and storing the selected service specifications in a chosen service set, then counting a frequency N for each data type used as the input parameter and a frequency M for each data type used as the output parameter in the chosen service set; if M>0, the data type is also used as the output parameter, and C×(N+M) new objects are declared in the domain file for the data type, wherein C is an integer;

a planning module for generating a series of action execution sequences of the single service or composite service, from service specifications stored in the service repository according to the problem file and the domain file, for being executed to accomplish the service request; and a service composition translation module for translating the composite service to a service flow document; and an execution engine for executing the service specification defined by the service flow document to accomplish the service request;

wherein the service specification translation module is also used for establishing at least one level of data-type-service graph between all service specifications and data types and following the interactive usage correlation structure to select at least one service specification related to the data type, and wherein the service request is a file with an XML format and translated into a problem file with a PDDL format via a translation process.

11. The system claimed in claim 10, wherein the composition engine is stored with one service registry.

12. The system claimed in claim 10, wherein the service specifications are defined by at least one service provider and published in a service repository of a service registry.

13. The system claimed in claim 10, wherein the service specifications are files with an XML format and are translated into a domain file with a PDDL format via a translation process.

14. The system claimed in claim 13, wherein a DMAL-S standard is used to define the service specifications, which includes definitions of a plurality of preconditions and effects, as a file based on a RDF format.

15. The system claimed in claim 13, wherein a WSDL standard is used to define the service specifications, which includes definitions of a service address, an action name, a plurality of input parameters and a plurality of output parameters, as a file with an XML format.

16. The system claimed in claim 10, wherein the service specifications are defined by at least one service provider and are published in a service repository of a service registry.

17. The system claimed in claim 10, wherein the service specification defines at least one precondition or at least one effect.

18. The system claimed in claim 17, wherein the service specification translation module is also used for adding a precondition and an effect to each output parameter of each service specification in the chosen service set.

19. The system claimed in claim 10, wherein the service request defines an initial state and a goal state and uses the series of action execution sequences to transform from the initial state to the goal state to accomplish the service request.

* * * * *

UNITED STATES PATENT AND TRADEMARK OFFICE
CERTIFICATE OF CORRECTION

PATENT NO.       : 7,617,174 B2
APPLICATION NO.  : 10/811900
DATED            : November 10, 2009
INVENTOR(S)      : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1284 days.

Signed and Sealed this

Nineteenth Day of October, 2010

David J. Kappos
*Director of the United States Patent and Trademark Office*